(12) United States Patent
Aronson et al.

(10) Patent No.: US 7,354,201 B2
(45) Date of Patent: Apr. 8, 2008

(54) DEVICES FOR REFLECTION REDUCTION IN OPTICAL DEVICES

(75) Inventors: Lewis B. Aronson, Los Altos, CA (US); John Christian Moller, Castro Valley, CA (US); Paul K. Rosenberg, Sunnyvale, CA (US); Stefano Schiaffino, Pleasanton, CA (US); Jignesh Shah, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/706,651

(22) Filed: Nov. 12, 2003

(65) Prior Publication Data

US 2004/0101258 A1 May 27, 2004

Related U.S. Application Data

(60) Provisional application No. 60/429,468, filed on Nov. 26, 2002.

(51) Int. Cl.
*G02B 6/36* (2006.01)
*G02B 6/42* (2006.01)

(52) U.S. Cl. .................. 385/78; 385/84; 385/88; 385/92

(58) Field of Classification Search ............ 385/76–94
See application file for complete search history.

(56) References Cited

U.S. PATENT DOCUMENTS

| 6,652,158 B2 * | 11/2003 | Bartur et al. .............. 385/92 |
| 6,663,296 B1 * | 12/2003 | Blair et al. ................ 385/92 |
| 6,758,611 B1 * | 7/2004 | Levin et al. ............... 385/93 |
| 6,789,955 B2 * | 9/2004 | Anderson .................. 385/88 |
| 2001/0004414 A1 * | 6/2001 | Kuhn et al. ............... 385/92 |
| 2003/0091304 A1 * | 5/2003 | Tonai et al. ............... 385/93 |

FOREIGN PATENT DOCUMENTS

JP 358121001 A * 7/1983

* cited by examiner

*Primary Examiner*—Michelle Connelly-Cushwa
(74) *Attorney, Agent, or Firm*—Workman Nydegger

(57) ABSTRACT

This invention describes an optical component incorporated in an optical device or subassembly for reducing reflections at the terminal end of an optical fiber. An optical device has a housing having an opening for receiving and securing a terminal end of an optical fiber. An optical component having a first facet and a second facet is positioned so that the first facet abuts the terminal end when the optical fiber is received in the opening. The optical component has a thickness that is chosen to be large enough that reflections from the second surface are sufficiently diverged to prevent substantial coupling back into the core of the optical fiber.

23 Claims, 4 Drawing Sheets

DEVICES FOR REFLECTION REDUCTION IN OPTICAL DEVICES

CROSS-REFERENCE TO RELATED APPLICATIONS

This patent application. claims priority to and the benefit of U.S. Provisional Patent Application Ser. No. 60/429,468, entitled "Return Loss Reduction in Optical Sub-Assemblies," filed on Nov. 26, 2002, which is hereby incorporated by reference in its entirety.

BACKGROUND OF THE INVENTION

1. The Field of the Invention

The present invention relates to optical sub-components for use in optical systems. or networks. More particularly, the present invention relates to systems and devices to reduce internal reflections of an optical signal in one or more optical sub-assemblies.

2. The Relevant Technology

Optical networks are widely used to communicate data over short and long distances in various networks, including telecommunications and data networks. Optical networks using optical fibers have become a preferred way of transmitting data due to the high bandwidth-inherent in optical networks, as well as the decreasing cost of components of such networks. In optical networks, data is encoded in optical signals, which are transmitted over optical fiber(s) between nodes in the network. These optical signals propagate along an optical fiber as the signal is internally reflected within a core of the optical fiber. The materials forming the core and the cladding of the optical fiber have different refractive indexes. Optical signals incident upon the interface between the core and the cladding is internally reflected rather than being refracted in accordance with the rule that light incident upon an interface between materials having different refractive indexes is reflected or refracted at such an interface. The amount of light being reflected or refracted and the directions of reflection or refraction depend upon the angle of incidence with the interface and the refractive indexes of the media across the interface.

Optical signals delivered along these optical fibers are generated using a laser included in a transmitter optical sub-assembly (TOSA) of a transceiver positioned at a node in the network. The transceiver converts electrical signals to optical signals. Optical signals generated by the transceiver and propagated by the optical fiber are received and detected by a photodetector that can be included in a receiver optical sub-assembly (ROSA) of another transceiver positioned at another node in the network. Because bi-directional communication is typically desired and is easily achieved in optical networks, transceivers generally include both a TOSA and a ROSA.

As mentioned above, the amount of light being reflected or refracted and the directions of reflection or refraction depend on the angle of incidence with the interface and the refractive indexes of the media at the interface. For example, approximately 4% of the light traveling from glass into air and approaching an interface between the glass and the air at a normal direction is reflected backward into the glass along the same normal direction of incidence. The remaining 96% of the light passes through the interface and proceeds into the air. In the case of an optical fiber terminated into air, as is typically the case with current TOSAs and ROSAs, the light reflected from a fiber end propagates back into the fiber and travels in the opposite direction of the incoming light.

Light propagating in opposite directions in a fiber can cause interference with other signals. If the fiber is connecting two optical transceivers, as in a standard communication link with a transmitter and a receiver at opposite ends, this optical interference can degrade the quality of the signal being transmitted. In particular, when significant reflections exist at both ends of an optical link, an optical cavity is formed with a net transmission that varies with wavelength. Small dynamic changes in a laser's wavelength (also known as chirp) can be converted to amplitude modulations by the cavity thus formed. These amplitude modulations can significantly impair the overall optical transmission link adding noise to the optical zero and one levels and reducing minimum difference between these values, which in turn introduces an optical power penalty to a link.

Additionally, reflections returning to the laser diode transmitter can induce a number of significant impairments in its output such as deleterious changes in the optical spectrum and large increases in the relative intensity noise (RIN) of its output.

Currently the return loss, i.e. the loss of signal strength resulting from such reflections or the loss in the reflection relative to the incident signal, is typically in the range of about −14.4 dB. Various optical networks have different requirements for this return loss. For example, the SONET specification defines the maximum allowable return loss as −27 dB. To meet these requirements, conventional optical sub-assemblies (OSAs) use a fiber stub that abuts the terminal end of the optical fiber. The terminal end of the fiber stub positioned away from the fiber end generally has a facet polished at an angle of about 6° to about 10° from being perpendicular to the direction of travel of the optical signal. Because the terminal end of the fiber stub has an angled facet, much of the optical signal internally reflected at the glass/air interface at the fiber stub terminal end is not transmitted back into the optical fiber, thus resulting in a reduction in the amount of light reflected at the interface and hence improving the return loss. Alternatively, the terminal end of the fiber stub can be coated with a set of dielectric layers that reduce reflections.

It should be noted that elimination of reflections from fiber facets is a necessary but not sufficient means to achieve high return loss. An optical subassembly must be designed so that reflections originating in other parts of the subassembly are not coupled back into the incoming fiber. It is presumed in all the examples of prior art and in the new invention that such measures have been taken to achieve an overall return loss target once the fiber reflection is reduced sufficiently.

While the use of such fiber stubs can successfully bring the return loss to the level required by the SONET and other specifications, fiber stubs introduce other problems into the transceiver design. For example, optical components, including transceivers, are becoming smaller and more compact. However, because of fabrication and other considerations, a fiber stub generally requires at least 2 mm of length in the transceiver. Additionally, the fiber stub increases the cost of the optical transceiver. Lastly, in the case of an angled fiber stub, there is a variation in the optical power coupled from a laser into the fiber that depends on (i) the degree of offset of the laser with respect to the fiber axis and (ii) the orientation of the fiber stub angled facet. Such variations result in a broadening of the distribution of output optical power.

There is, therefore, a need for methods, systems and devices that reduce reflection in optical components, improve the return loss, and limit the size of the transceiver.

BRIEF SUMMARY OF THE INVENTION

The present invention generally relates to optical devices or sub-components that transmit and receive optical signals while reducing reflection or improving return losses associated with transmitting and receiving such optical signals that typically occur with existing optical devices. The present invention also relates to optical devices or sub-components that have a shorter overall length and associated optical path than is typically achieved with other existing devices that reduce reflection or improve return losses.

An optical device, such as a Transmitter Optical Subassembly (TOSA) or Received Optical Subassembly (ROSA), in accordance with one aspect of the present invention includes a housing that is adapted to receive an optical fiber. The housing has an opening for receiving a terminal end of the optical fiber and a port for accepting an optoelectronic package, such as those optoelectronic packages associated with a TOSA, which includes a packaged laser diode and associated lenses or a ROSA, which includes a packaged detector and preamplifier circuit and lens. Disposed within at least a portion of the port or the opening is an optical component. This optical component has a first facet and a second facet parallel to the first facet. The first facet of the optical component contacts a terminal end of the optical fiber so that the optical signals are incident upon the first facet. The second facet of the optical component is disposed from the terminal end a distance that substantially prevents optical signals being internally reflected within the optical component from coupling back into the terminal end of the optical fiber.

In accordance with another aspect of the present invention, the optical device can include a multi-piece housing. This housing, in one configuration, has a base and a ferrule mounted to the base. This ferrule is distinguished from a ferrule used in most optical connector designs that is used to support and center the bare optical fiber because the ferrule accommodates additional optical components to aid in achieving a desired return loss. The base has a port for accepting an optoelectronic package, such as those optoelectronic packages associated with a TOSA or ROSA, and a protrusion/recess combination that enables the ferrule to mate with the base. The base protrusion engages with an opening in the ferrule; the ferrule receiving at least a portion of the optical fiber. When the base protrusion mates with the base, an exterior surface of the ferrule engages with a recess formed in base.

Disposed within at least a portion of the port and/or the opening is an optical component. This optical component is positioned so as to abut a terminal end of the optical fiber when the ferrule is received in the base. The optical component has a diameter that is greater than a diameter of the core of the optical fiber. Also, the thickness of the optical component (i.e. the distance between its first and second surface is chosen such that light from the fiber which is reflected from the second surface diverge enough through its round-trip transit through the component such that the overlap between the reflected spot and the optical fiber core is very small and thus the reflected coupling back into the fiber is small enough to achieve the desired return loss. In another configuration, the second surface of the optical component can include an anti-reflection coating to reduce the reflected coupling and achieve the desired return loss.

This disparity in dimensions of the optical component and optical fiber aids in reducing reflection and improving the return losses occurring when an optical signals propagates through the optical device, whether such propagation occurs from the optical fiber to an optoelectronic package or from an optoelectronic package to the optical fiber.

In accordance with another aspect of one exemplary configuration of one embodiment of the present invention, disposed between a facet of the optical component and the optoelectronic package is a region of low refractive index. Stated another way, the refractive index of the media or air disposed between the optical component and the optoelectronic package is lower than the refractive index of the optical component. This difference in refractive index causes the reflections of the light incident upon the interface. By incorporating the optical component into the optical device, reflected light propagates away from the core of the optical fiber so that as the light diverges from this reflection point, only a very small amount of it couples back into the fiber core.

In accordance with another configuration of one embodiment of the present invention, a mount securely retains the optical component within the optical device. A lip of the mount can retain the optical component. Alternatively, the optical component attaches to a surface of the mount facing a direction opposite to the direction in which the lip extends. In either case, the mount includes one or more members that aid with attaching or positioning the mount and the optical component within the housing.

The optical devices of the present invention provide a significant improvement in the return loss experienced at the terminal end of the optical fiber and reduce reflection at the terminal end. The optical devices of the present invention also provide a complete package that is smaller than prior art sub-assemblies using fiber stubs. This allows for savings in manufacturing costs. Additionally, the present invention is much lower cost than the prior-art subassemblies using fiber stubs.

These and other objects and features of the present invention will become more fully apparent from the following description and appended claims, or can be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention relates to optical devices, such as TOSAs and ROSAs, which incorporate optical components to reduce the internal reflection at a terminal end of an optical fiber. Instead of using a fiber stub, optical devices constructed according to the invention use an optical component, which abuts the terminal end of the optical fiber. The optical component has a refractive index that is substantially equal to the refractive index of the optical fiber to minimize the internal reflection at the interface between the terminal end of the optical fiber and the optical component. The transmissive portion of this optical component is substantially greater than the diameter of the core of the optical fiber. With this configuration, light reflected at the interface with air within the optical device propagates away from a core of the optical fiber so that as the light diverges from this reflection point, only a very small amount of it couples back into the fiber core. In this manner, the optical devices of the present invention aid with achieving the desired return loss.

The accompanying drawings illustrate exemplary embodiments or configurations of the present invention. While these drawings illustrate different exemplary embodiments or configurations of optical devices, such as TOSAs and ROSAs with the associated optical components, one skilled in the art will appreciate that the features and functions of one exemplary embodiment or configuration can be used with other embodiments or configurations of the present invention. The optical devices of the present invention reduce reflections within the optical sub-assemblies and thereby improve return losses by using an optical component in which portions or components of an optical signal incident upon the optical component diverge after being transmitted from a terminal end of the optical fiber to the optical component.

Figure 1:
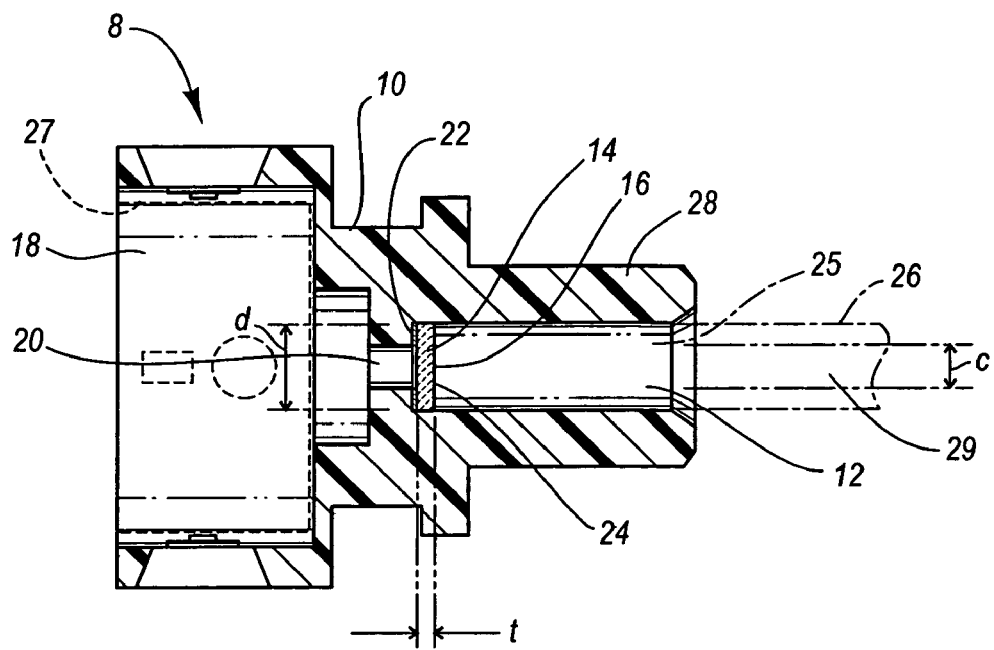
FIG. 1 illustrates an optical device according to one aspect of the present invention.

FIG. 1 depicts an optical device 8 in accordance with one exemplary embodiment of the present invention. Optical device 8 can function as a ROSA. Optical device 8 can alternatively be a TOSA or other optical device that can obtain a benefit from practice of the present invention. The discussion related to the ROSA applies to the TOSA and other optical devices. As illustrated, optical device 8 has a housing 10 that cooperates with an optical fiber 26, illustrated in dotted lines, and an optoelectronic package, i.e., such as a packaged detector and preamplifier circuit and lens, also illustrated in dotted lines. An optoelectronic package 27 can include a photodetector and transimpedance amplifier circuit packaged in a hermetic assembly known as a TO-can (transistor outline) and containing in its lid a ball or reflowed lens. Alternatively, the TO-can receiver element can have a flat optical window, with a discrete or integrated lens incorporated into the housing.

Housing 10 includes a fiber opening 12 formed in a nosepiece 28 that securely holds optical fiber 26. Alternately, nosepiece 28 can be adapted to hold a ferrule (not shown) that contains optical fiber 26. Fiber opening 12 receives optical fiber 26, while a port 18 formed in housing 10 receives the lens and photodetector assembly 27.

Extending between fiber opening 12 and port 18 is a channel 20 through which optical signals propagate during use of optical device 8. In one embodiment, channel 20 is an air space between optical fiber 26 and the optoelectronic package 27. Although channel 20 is an air space, however, one skilled in the art will appreciate that channel 20 can include one or more other optical components that facilitate the transmission of optical signals from a terminal end of optical fiber 26 to the lens and photodetector assembly (not shown).

In this exemplary configuration, fiber opening 12 receives an optical component 14 and a terminal end 24 of optical fiber 26. Optical component 14 has a first facet 16 that optically communicates with terminal end 24 of optical fiber 26 and a second facet 22 that optically communicates with channel 20. This configuration positions terminal end 24 in close proximity to optical component 14 to aid with reducing the internal reflection of optical signals at terminal end 24 of optical fiber 26. Optical fiber 26 can be terminated in a ferrule 25 and ferrule 25 connected to nosepiece 28 by being inserted into opening 12. As known to one skilled in the art appropriate spring loaded mechanisms (not shown) can be used to maintain optical fiber 26 in contact within opening 12. Alternatively, optical fiber 26 can be secured within opening 12 by way of adhesives, sonic bonds, thermal bonds, or other structures capable of securing an optical fiber to a housing.

Optical component 14 can have various configurations so long as it aids in reducing the internal reflections of optical signals at terminal end 24 of optical fiber 26. For instance, optical component 14 has sufficient strength to withstand the impact of a terminal end of an optical fiber when it is in contact with optical component 14. The materials forming optical component 14 have a refractive index substantially similar to the refractive index of the material forming optical fiber 26 to reduce reflections at the interface between the optical fiber and the optical component and so improve return loss. In one configuration, the refractive index of optical component 14 is substantially similar to a refractive index of a core 29 of optical fiber 20. Illustratively, the refractive index can be 1.468 that would match Corning SMF-28 fiber at a wavelength of 1310 nm. The refractive index can be selected as any convenient value close enough in wavelength to that of the optical fiber to result in a suitably low optical reflection. This can be determined by using the equation for Fresnel reflection at a dielectric interface give by $R=(n2-n1)^2/(n2+n1)^2 \sim \Delta n^2/4(n1^2)$, where n1 is the index of the fiber mode, n2 is the index of the fiber plate, and $\Delta n$ is the difference in these two indices. As an example, if the desired maximum reflection is −27 dB or ~0.002, then the maximum allowable difference $\Delta n$ in indices for fiber index n1=1.468 would be ~0.13 or a total refractive index range of 1.337 to 1.599, a very wide range which would allow many material choices. In practice, one would choose a value in a narrower range to provide a margin to the desired reflectivity. Selecting different materials for optical component 14 achieves these refractive indexes.

In the configuration illustrated in FIG. 1, an optical signal entering optical component 14 diverges as it propagates from terminal end 24 of optical fiber 26. As the diverging optical signal reaches second facet 22 of optical component 14, most of the signal passes from optical component 14 into channel 20 and thereafter into the remaining components of optical device 8. Unlike fiber stubs used in conventional optical transceivers, first facet 16 of optical component 14 optically communicates with terminal end 24 of optical fiber 26, and is substantially perpendicular to a longitudinal axis of optical fiber 26. Similarly, second facet 22 is substantially parallel to first facet 16. Since the refractive index of core 29 of optical fiber 26 is substantially identical to that of optical component 14 and there is no air gap therebetween, substantially no optical signals are reflected at the interface between optical component 14 and optical fiber 26. Because of the difference between the refractive index of optical component 14 (often about 1.47 or higher) and the refractive index of air within channel 20 (approximated to a refractive index of 1.0), a portion of the propagating optical experiences internal reflection. However, because the optical signal is divergent through optical component 14, much of the optical signal has an angle of incidence at second facet 22 of less than 90°. Thus, the majority of the internally reflected portion of the optical signal continues to diverge from the longitudinal axis of optical fiber 26 upon reflection. In addition, optical component 14 has a thickness that is chosen to be large enough that the diverged optical signal that returns to the endface of the fiber is large enough so that only a very small fraction of that reflected signal will be coupled back into the fiber. In other words, most of the reflected portion of the optical signal reflects away from the core of optical fiber 26 without entering into the core of optical fiber 26. In general, optical component 14 can have various configurations and can have a dimension "d" that is substantially identical to or lesser than the diameter or dimension of opening 12.

In general, two primary factors define the amount of the optical signal reflected back into optical fiber 26 in optical devices constructed and used according to the invention. Firstly, any mismatch between the refractive indexes of optical fiber 26 and optical component 14 causes reflection of a certain amount of the optical signal at the interface between optical fiber 26 and optical component 14. Selecting a refractive index of optical component 14 that substantially matches that of core 29 of optical fiber 26 reduces reflections and improves the return loss at the interface between optical fiber 26 and optical component 14. In addition, an anti-reflection (AR) coating at the interface can further reduce this internal reflection. The component 14 that abuts terminal end 24 of optical fiber 26 can be formed from any optical materials, such as, but not limited to, glass, polymer, synthetic materials, natural materials, fused silica, combinations thereof, or any material capable of allowing electromagnetic radiation to propagate therethrough. Similarly, the optical component can have any refractive index, so long as the refractive index is complementary to the refractive index of the optical fiber.

Secondly, the amount of the optical signal internally reflected at second facet 16 of optical component 14 and launched back into optical fiber 26 is approximately a function of the ratio between the thickness of optical component 14 and the effective diameter or dimension of optical fiber 26. As used herein, the "effective diameter" or "effective dimension" of the optical fiber is defined to be the diameter or dimension of the central waveguide portion or core of the optical fiber into which the optical signal is launched and transmitted into the optical fiber. The ratio mentioned above relates to the geometry of the divergent optical signal in optical component 14 and that portion of the internally reflected optical signal directed back to the optical fiber. Selections of the dimensions of optical component 14 are dependant upon the requirements associated with the return loss in the optical network. For instance, in one configuration, optical component 14 has at least one dimension greater than the diameter or dimension of the core of an optical fiber abutting optical component 14.

Because of the configuration of optical device 8, optical component 14 prevents significant portions of the reflected optical signal from entering into optical fiber 26 and interfering with the optical signals traveling through optical fiber 26. The use of the optical components of the invention has significant advantages over the use of fiber stubs. In particular, the length increase of the optical device is the difference in optical path length for optical signals traveling through air. For example, in the case of a 1 mm thick optical component made from glass, sufficient to achieve SONET return losses <−27 dB, the package length increase is only approximately 0.3 mm. This length is much less than the length of the fiber stubs, which is generally at least 2 mm. This reduction in the length of the optical component that controls the return loss in turn reduces the required dimensions of the transceiver and reduces reflection of optical signals. In addition, the cost of fabricating the optical device according to one embodiment of the present invention can be less than that of conventional TOSAs and ROSAs having fiber stubs. One skilled in the art understands that optical component 14 can have thicknesses with a resultant variation in the increase in reflected light. For instance, optical component 14 can have a thickness "t" of less than or greater than 2 mm.

Figure 2:
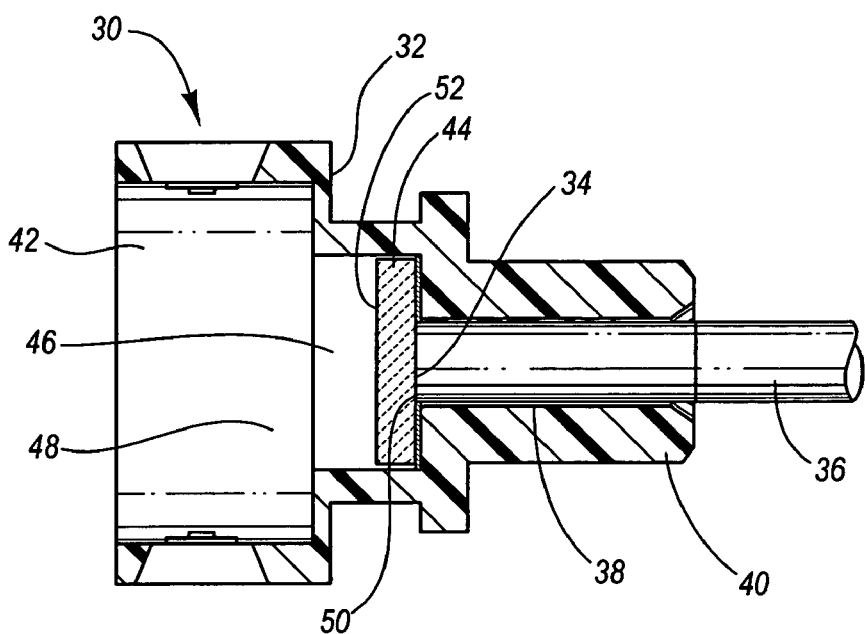
FIG. 2 illustrates another optical device according to another aspect of the present invention.

FIG. 2 illustrates another exemplary embodiment of the present invention in association with another optical device, identified by reference numeral 30. This optical device 30 illustrates the present invention practiced in association with a ROSA, however, one skilled in the art will understand that the invention is not limited to use with a ROSA but can be implemented in a TOSA. The optical device 30 includes a housing 32 that receives a terminal end 34 of optical fiber 36. More specifically, an opening 38 in nosepiece 40 receives optical fiber 36.

Optical device 30 also includes a port 42 that accepts at least a portion of an optical component 44. This port 42 has a stepped configuration with optical component 44 at least partially received in a first region 46, while the optoelectronic package, such as a packaged photodetector and lens (not shown) can be received by a second region 48. In this configuration, a first facet 50 of optical component 44 abuts terminal end 34 of optical fiber 36 when fiber 36 engages with housing 32, while an air gap is formed between a second facet 52 of optical component 44 and the lens and photodetector assembly (not shown). In other configurations, other optical components having a refractive index lesser than the refractive index of optical component 44 can be disposed between second facet 52 of optical component 44 and the optoelectronic package.

As mentioned above, optical component 44 is sufficiently rigid to withstand the impact of terminal end 34 of fiber 36 when placed in contact with optical component 44. In this embodiment, optical component 44 bonds to housing 32. The bond created between housing 32 and optical component 44 prevents optical component 44 from moving under the force applied by terminal end 36 of fiber 36. The optical components shown in FIG. 2 work substantially the same way as the optical components of FIG. 1 discussed above.

Figure 3:
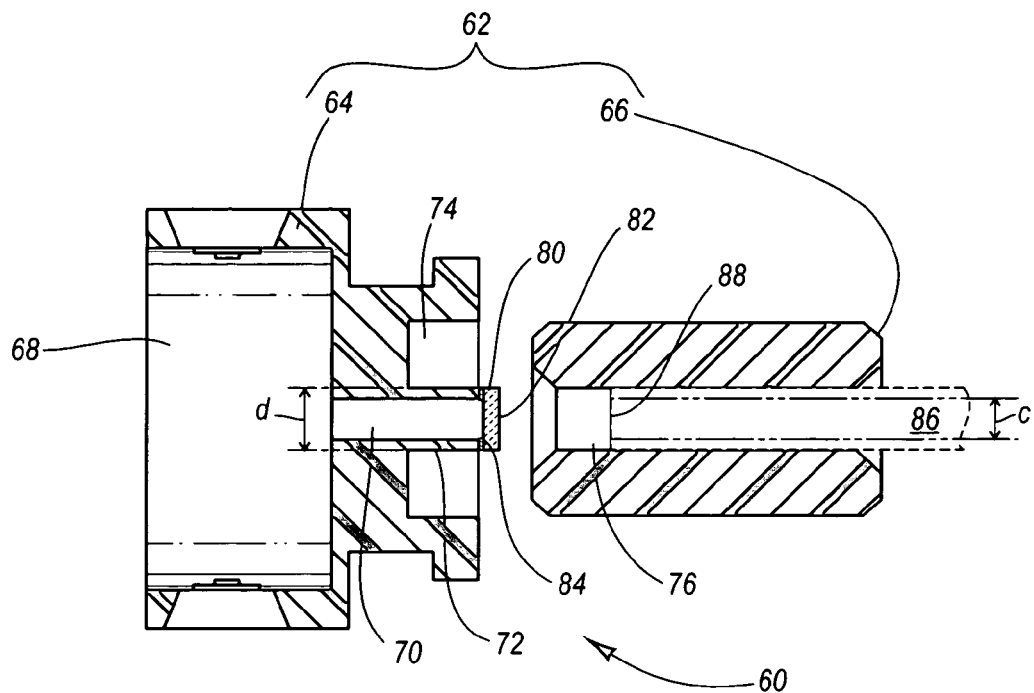
FIG. 3 illustrates yet another optical device according to yet another aspect of the present invention.

FIG. 3 illustrates another alternative embodiment of the present invention. The features and functions of the other optical devices of the present invention also apply to the device illustrated in FIG. 3. The optical device 60 has a two-piece housing 62. This housing 62 includes a base 64 and a ferrule 66 that, as illustrated, cooperates with base 64. The base 64 includes a port 68 adapted to accept at least a portion of a lens and photodetector assembly (not shown). A channel 70 extends from port 68 to a connecting protrusion 72 and associated recess 74. The protrusion 72 and recess 74 cooperate with ferrule 66. Therefore, each of the protrusion 72 and recess 74 can have various configurations so long as they facilitate cooperation between base 64 and ferrule 66.

For instance, ferrule 66 can include an opening 76 that receives protrusion 72 as an end of ferrule 66 engages with recess 74. These openings, protrusions, recesses, and ends can have various cross-sectional configurations, such as, but not limited to, circular, ovular, polygonal, or any other configuration so long as the protrusions and recesses can engage with corresponding openings and ends.

In light of the above, ferrule 66 can connect to base 64 in many different ways. For example, ferrule 66 can be press or friction fit into base 64, such as press or friction fit of protrusion 72 into opening 76 and/or an end of ferrule 66 into recess 74. Alternatively, ferrule 66 can be threaded or have some mechanical structure that holds ferrule 66 into base 64 having a complementary thread or complementary structure. Additionally, ferrule 66 can attach to base 64 using some type of adhesive, whether permanent or temporary. Any combination of the above means for fastening a ferrule to a base is possible.

Regardless of how ferrule 66 attaches or connects to base 64, an optical component 80 cooperates with an end of protrusion 74. The optical component 80 can be similar in structure and function to the other optical components described herein. For instance, optical component 80 can have two substantially parallel facets, a first facet 82 and a second facet 84. The first facet 82 of optical component 80 abuts a terminal end 88 of optical fiber 86 when fiber 86 is secured inside opening 76, while second facet 84 of optical component 80 optically communicates with channel 70 that acts as a region of lower refractive index relative to the refractive index of optical component 80. In this configuration, optical component 80 has a dimension "d" that is greater than a dimension "c" of optical fiber 86, where dimension "d" is the width or diameter of optical component 80 and dimension "c" represents the width or diameter of the core of optical fiber 86. In still other configurations, one or more optical coatings can be used, reducing the quantity of optical signals reflected from second facet 84 and increasing the quantity of optical signals transmitted.

Figure 4:
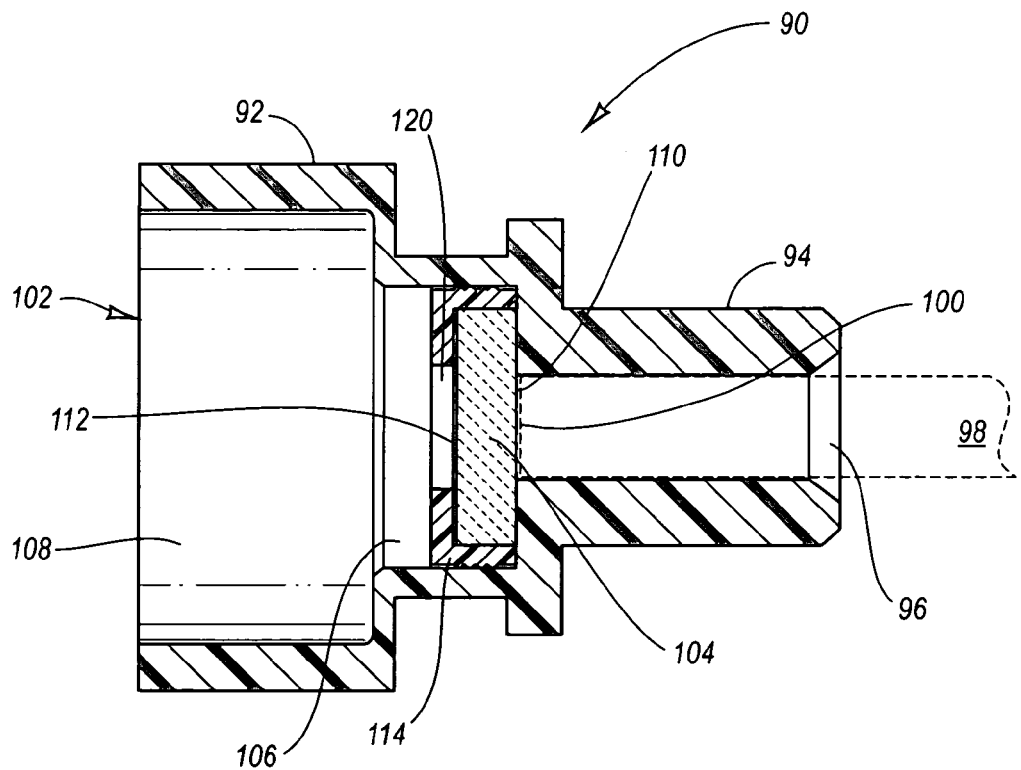
FIG. 4 illustrates a further optical device according to another aspect of the present invention.

FIG. 4 illustrates another embodiment of an optical device in which an optical component reduces reflections and improves return loss. In FIG. 4, an optical device 90, such as a ROSA, includes a housing 92 having a nosepiece 94 with an opening 96 adapted to receive and secure a terminal end 100 of an optical fiber 98. Housing 92 includes a port 102 configured to receive an optoelectronic package having a lens and a packaged photodetector (not shown) associated with optical device 90. As with the embodiment or configuration of the optical device depicted in FIG. 2, port 102 accepts at least a portion of an optical component 104. The port 102 has a stepped configuration with optical component 104 at least partially received in a first region 106, while an optoelectronic package, such as a ROSA, which includes a packaged detector and preamplifier circuit and lens, can be received by a second region 108. In this configuration, a first facet 110 of optical component 104 abuts terminal end 100 of optical fiber 98 when fiber 98 engages with housing 92, while an air gap is formed between a second facet 112 of optical component 104 and the optoelectronic package (not shown). In other configurations, other optical components can be disposed between second facet 112 and the receiver 102.

A mount or holder 114 fits into at least a portion of port 102 and secures optical component 104 in a position where first facet 110 abuts terminal end 100 of optical fiber 98 and optionally a portion of housing 92. The optical component 104 can be bonded to mount 114 such as through adhesives, thermal bonds, friction fits, mechanical fasteners, or other manners known to those skilled in the art to connect one optical component to a mount.

Figure 5:
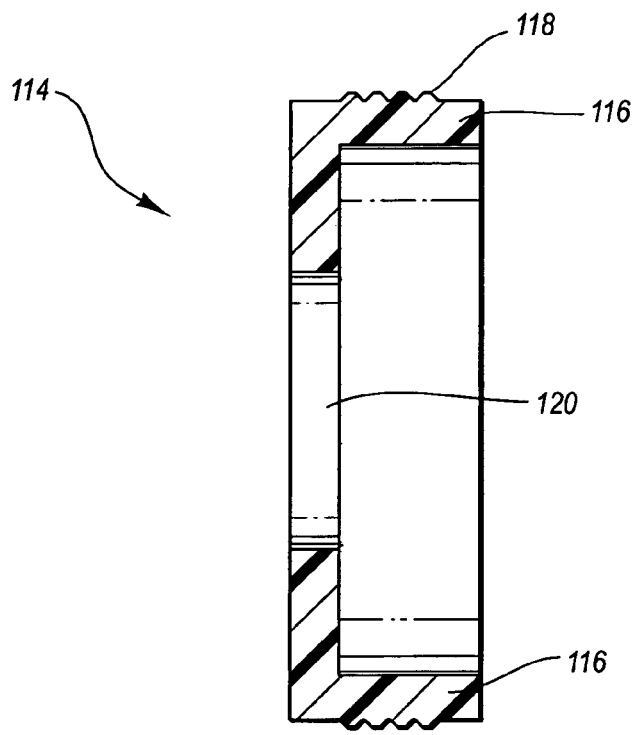
FIG. 5 illustrates a mount adapted to position an optical component within the optical device of FIG. 4 according to another aspect of the present invention.

In the illustrated configuration of FIG. 5, mount 114 has an annular lip 116 from which extend one or more members 118. Positioned within an interior region defined by annular lip 116 is optical component 104. Upon positioning mount 114 to securely position optical component 104 (FIG. 4), these one or more members 118 at least partially flex or deform so that mount 114 is friction or press fit into port 102. The force, such as a biasing force, applied by these members 118 prevent optical component 104 from moving during use of optical device 90.

Disposed through mount 114 is a hole 120. This hole 120 allows the optical signals or electromagnetic radiation carrying the optical signals to propagate from optical component 104 toward second region 108 of port 102 and hence a lens and photodetector assembly (not shown) that can be disposed therein. The hole 120 also provides an air space or acts as an air space to provide the change in refractive index that enables propagating signals or radiation to exit from optical component 104.

Figure 6:
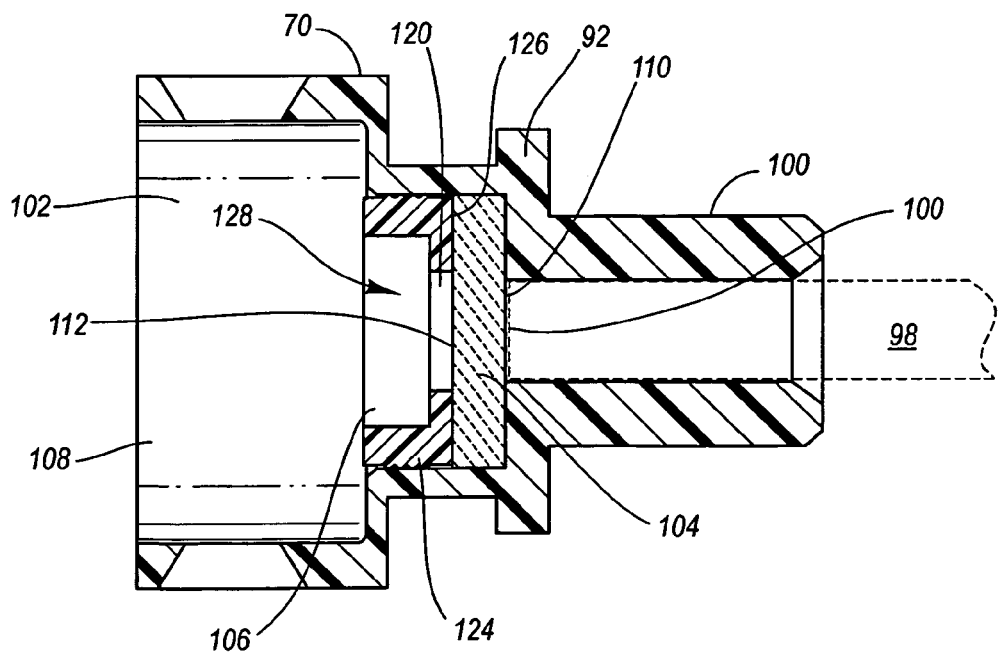
FIG. 6 illustrates an additional optical device according to another aspect of the present invention.

FIG. 6 illustrates another embodiment that is similar to the optical device illustrated in FIGS. 4 and 5. In contrast to the optical device depicted in FIGS. 4 and 5, optical device 120 includes a mount 124 that receives or cooperates with optical component 104 upon a surface 126 rather than within an interior region 128 defined by lip 116. The mount 124 positions first facet 110 against a portion of housing 92 and abuts terminal end 100 of optical fiber 98 as one or more members 118 that extend from lip 116 engage with a portion or interior surface of port 102. The second facet 112 abuts surface 126 rather than interior region 128. As with other embodiments or configurations of optical devices, optical component 104 can attach or connect with housing 92 and/or mount 124 through use of adhesives, press or friction fits, thermal or chemical bonds, mechanical fasteners, or other structures capable of performing the function of connecting an optical component to a mount or housing.

Generally, the discussion relates to use of the optical components and devices of the present invention with reference to a ROSA-type optical device with associated discussion of specific internal components associated with a ROSA. However, the present invention and the exemplary embodiments of the present invention are also applicable to TOSAs. In general, TOSAs experience a certain amount of return loss, which can impair the operation of the components of the TOSAs unless measures are taken to prevent significant portions of the light or electromagnetic radiation from being reflected and transmitted in the return path. Thus, optical components can also be used at the interface with the terminal end of the optical fiber that receives the optical signal from the laser to reduce the amount of laser energy reflected back into the laser.

In a TOSA, a lens is used to focus laser or electromagnetic pulses on the end of the optical fiber, through the optical component. The optical signal is incident on the surface of the optical component facing the laser at an angle less than 90 degrees. This greatly reduces the potential for interference from light or electromagnetic radiation reflected from the surface of the optical component facing the laser, since (i) the majority of the light or radiation incident upon the surface of the optical component is refracted, with the majority of any reflected light or radiation propagating away from the lens or being refracted by the lens at a point remote from the laser, and (ii) any light or radiation internally reflected from the end of the optical fiber continues to diverge from the longitudinal axis of the adjacent optical fiber so that the reflected light or radiation propagates away from the laser.

Figure 7:
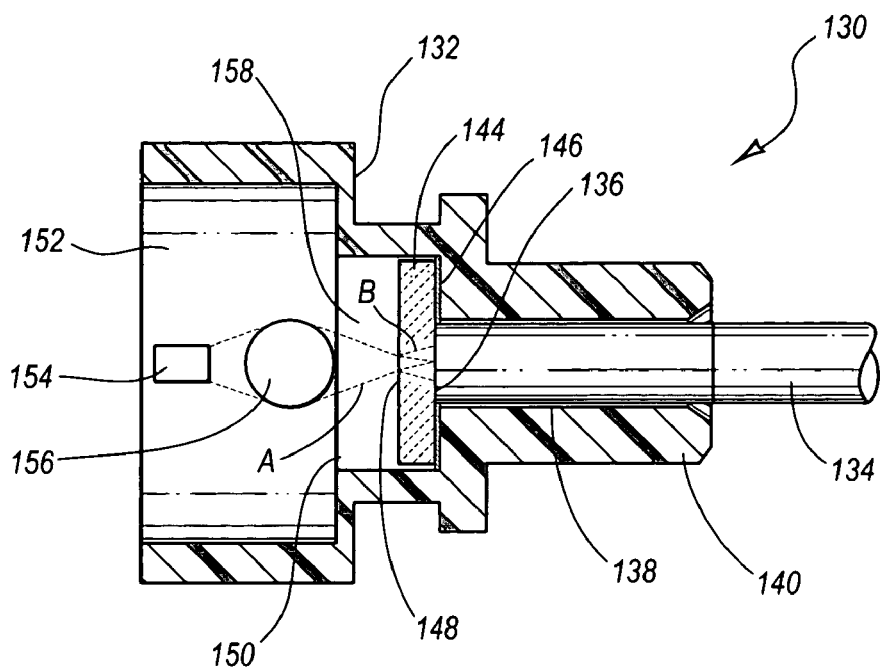
FIG. 7 illustrates a transmitter optical device according to another aspect of the present invention.

FIG. 7 illustrates a TOSA 130 having a housing 132. The TOSA 130 can have a similar structural configuration to those of the other optical devices described herein, except that housing 132 is adapted to cooperate with an optoelectronic packaging having a packaged laser diode and one or more lenses rather than an optoelectronic package having a lens and a packaged photodetector typically associated with a ROSA. An opening 138 in nosepiece 140 receives and secures a terminal end 136 of optical fiber 134. Positioned within a portion of a port 150 is an optical component 144. A first facet 146 of optical component 144 abuts terminal end 136 of optical fiber 134 when fiber 134 engages with housing 132. As with other embodiments, epoxy resin, adhesives, bonds, and/or mechanical structures secure optical component 144 within port 150.

An optoelectronic package 152 also cooperates with port 150 and, in one configuration, is spaced apart from a second facet 148 of optical component 144. An optoelectronic package 152 includes a packaged edge-emitting laser or surface-emitting laser (VCSEL), identified with reference numeral 154 and a lens 156. The lens 156, such as, but not limited to, a ball lens or other type of lens or optical component, is spaced apart from optical component such that light transmitted from packaged laser 154 passes through lens 156, and is focused through optical component 144 onto terminal end 136 of fiber optic cable 134, as shown by line A. Positioned between second facet 148 of the optical component 144 and optoelectronic package 152 is region of low refractive index material 158, such as air or other low refractive index material. Light is incident on second facet 148 of optical component 144 at an angle less than 90 degrees, thus preventing light from being reflected back through lens 156 causing interference. Instead, as shown by line B, the light is reflected away from second facet 148.

Figure 8:
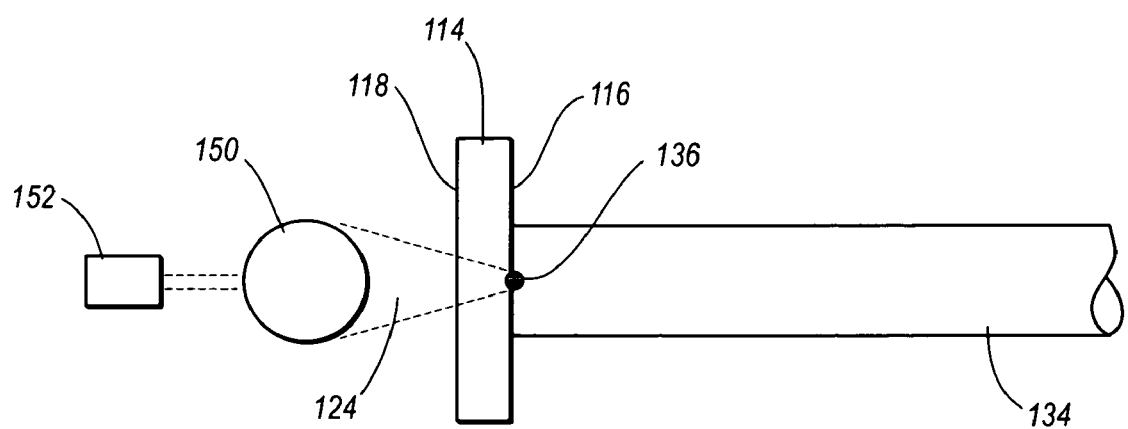
FIG. 8 illustrates the optical path of light using the optical components of the TOSA of FIG. 7.

FIG. 8 illustrates the path that light travels from packaged laser 154 to terminal end 136 of optical fiber 134 in a schematic format. Light propagating from packaged laser 154 passes through lens 156. The lens focuses the transmitted light through optical component 144 and onto terminal end 136 of optical fiber 134. The light is incident on second facet 148 of optical component 144 at an angle that is less than 90 degrees. Resultantly, this light is reflected and refracted toward packaged laser 154, thus improving return loss. Similarly, the light reflected from first facet 146 is either internally reflected or refracted from lens 156 at second facet 148. This again improves return losses.

The present invention, therefore, provides various devices that can be used to reduce the amount of undesired reflected electromagnetic radiation that propagates into an optical fiber and/or is incident upon a laser transmitter. The present invention can be embodied in other specific forms with other specific applications without departing from its spirit or essential characteristics. The described embodiments are to be considered in all respects as illustrative only and not restrictive.

What is claimed and desired to be secured by Letters Patent is:

1. An optical device adapted to receive an optical fiber having a core through which optical signals propagate, the optical device comprising:
   a housing having:
      an opening for receiving a terminal end of the optical fiber, and
      a port located on a portion of the housing substantially opposite to the opening for receiving a terminal end of the optical fiber;
   an optical component having a first facet and a second facet, the second facet being substantially parallel to the first facet, the first facet of the optical component contacting the terminal end of the optical fiber so that the optical signals are incident upon the first facet, while the second facet of the optical component is disposed from the terminal end a distance that enables the optical signals which are internally reflected within the optical component to be substantially prevented from entering into the terminal end of the optical fiber; and
   a mount configured to position the optical component within at least a portion of the port, the mount defining a hole that extends through the mount and that enables optical signals to pass from one portion of the optical device to another portion of the optical device, wherein a portion of the second facet of the optical component contacts the mount, and wherein the mount is configured to hold a portion of the first facet of the optical component against the housing.

2. The optical device as recited in claim 1, wherein the first facet is normal to the axis of the terminal end of the fiber.

3. The optical device as recited in claim 1, wherein the optical component is formed from a material selected from the group consisting of glass and plastic.

4. The optical device as recited in claim 1, further comprising an optoelectronic package disposed within the port.

5. The optical device as recited in claim 4, wherein the optoelectronic package comprises a package selected from the group consisting of a receiver optical sub-assembly and a transmitter optical sub-assembly.

6. The optical device as recited in claim 4, wherein the optoelectronic package comprises a transmitter sub-assembly that comprises:
   a laser; and
   a lens in optical communication with the laser.

7. The optical device as recited in claim 1, wherein the optical component has an axis that is perpendicular to a facet formed at the terminal end of the optical fiber.

8. The optical device as recited in claim 1, wherein the optical component has a thickness of less than about 2 mm.

9. The optical device as recited in claim 1, wherein the optical component has a thickness of approximately 1 mm.

10. The optical device as recited in claim 1, wherein the mount comprises a lip disposed about a periphery of the mount and one or more members extending from the periphery of the mount.

11. The optical device as recited in claim 1, wherein the hole passing through the mount is substantially aligned with an axis of the terminal end of the optical fiber when the terminal end of the optical fiber is received in the opening of the housing.

12. An optical device, comprising:
   a base defining a port and a recess, and the base including a protrusion that extends into the recess;
   a ferrule configured to mate with the base such that the protrusion extends into the ferrule when the ferrule is mated with the base; and
   an optical component supported by the protrusion, the optical component having a first facet and a second facet that are substantially parallel to each other, the first facet being arranged for contact with a terminal end of an optical fiber when the optical fiber is positioned in the ferrule and the ferrule is mated with the base.

13. The optical device as recited in claim 12, further comprising an optoelectronic package positioned in the port such that an air gap is disposed between the optical component and the optoelectronic package.

14. The optical device as recited in claim 13, wherein the optoelectronic package is an optical subassembly.

15. The optical device as recited in claim 12, wherein the protrusion defines a channel that communicates with the port.

16. The optical device as recited in claim 12, wherein the base further comprises a region, disposed between the optical component and the port, which has a refractive index lower than a refractive index of the optical component.

17. The optical device as recited in claim 16, wherein the region comprises an air gap.

18. An optical device, comprising:
 a housing that includes a nosepiece configured to receive a terminal end of an optical fiber, and the housing defining a port;
 an optical component having a first facet and a second facet that are substantially parallel to each other, the first facet of the optical component being arranged for contact with the terminal end of the optical fiber when the optical fiber is received in the nosepiece; and
 a mount that contacts the second facet of the optical component so as to facilitate positioning of the optical component within the housing, the mount defining a hole that extends through the mount and that enables optical signals to pass from one portion of the optical device to another portion of the optical device.

19. The optical device as recited in claim 18, further comprising a second optical component, the second optical component being positioned in the port.

20. The optical device as recited in claim 19, wherein the second optical component comprises an optical sub-assembly.

21. The optical device as recited in claim 19, wherein the base further comprises a region, disposed between the first optical component and the second optical component, which has a refractive index lower than a refractive index of the first optical component.

22. The optical device as recited in claim 19, wherein the base further comprises an air gap disposed between the first optical component and the second optical component.

23. The optical device as recited in claim 18, wherein the hole passing through the mount is substantially aligned with an axis of the terminal end of the optical fiber when the terminal end of the optical fiber is received in the nosepiece.

* * * * *

UNITED STATES PATENT AND TRADEMARK OFFICE
CERTIFICATE OF CORRECTION

PATENT NO. : 7,354,201 B2  Page 1 of 2
APPLICATION NO. : 10/706651
DATED : April 8, 2008
INVENTOR(S) : Aronson et al.

It is certified that error appears in the above-identified patent and that said Letters Patent is hereby corrected as shown below:

Drawings
Sheet 3, Figure 6, change label "100" to --94--

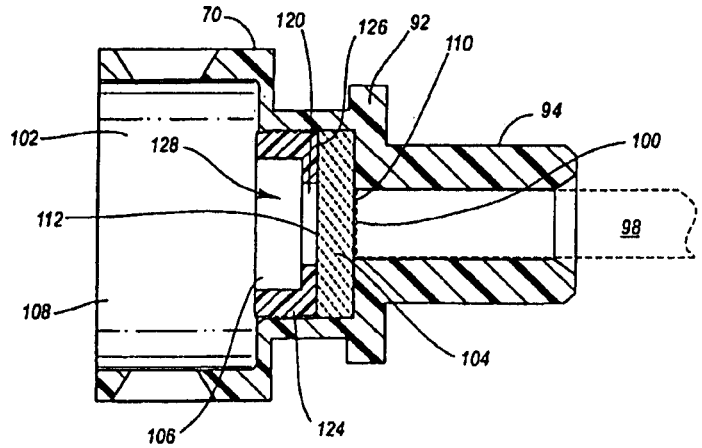

Fig. 6

Signed and Sealed this

Seventeenth Day of August, 2010

David J. Kappos
*Director of the United States Patent and Trademark Office*

CERTIFICATE OF CORRECTION (continued)

U.S. Pat. No. 7,354,201 B2

Sheet 4, Figure 8, replace the drawing for Figure 8 with the following depiction of the drawing, wherein the numbers have been corrected in the representation.

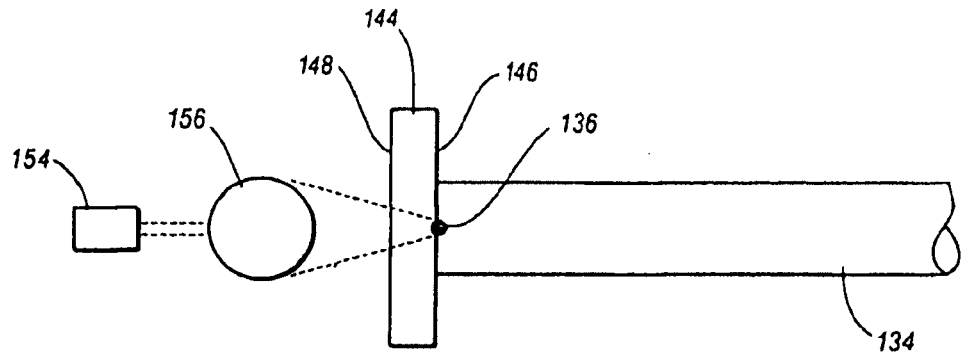

Fig. 8

Column 1
Line 35, change "is" to --are--

Column 3
Line 47, change "in base" to --in the base--
Line 55, change "suface is" to --surface) is--
Line 56, change "diverge" to --diverges--
Line 66, change "signals" to --signal--

Column 6
Line 35, change "20" to --26--

Column 7
Line 46, change "16" to --22--

Column 8
Line 52, change "36" to --34--

Column 9
Line 21, change "74" to --72--

Column 10
Line 30, change "116" to --116 (FIG. 5)--

Column 11
Line 26, change "component" to --component 144--
Line 31, change "is region" to --is a region--